United States Patent [19]

Mulach

[11] 4,227,109  
[45] Oct. 7, 1980

[54] SYSTEM FOR PROVIDING UNIFORM AXIAL EXPANSION OF A STATOR CORE

[75] Inventor: Arthur Mulach, Penn Hills Township, Allegheny County, Pa.

[73] Assignee: Westinghouse Electric Corp., Pittsburgh, Pa.

[21] Appl. No.: 965,013

[22] Filed: Nov. 30, 1978

[51] Int. Cl.³ .............................................. H02K 1/12
[52] U.S. Cl. .................................... 310/258; 310/65; 310/217
[58] Field of Search ............... 310/216, 217, 218, 254, 310/258, 259, 260, 51, 91, 52, 54, 55, 58, 59, 64, 65, 257; 336/213, 216, 217

[56] References Cited

U.S. PATENT DOCUMENTS

| | | | |
|---|---|---|---|
| 2,774,000 | 12/1956 | Ross | 310/259 |
| 3,949,257 | 4/1976 | Cooper | 310/260 |
| 3,987,325 | 10/1976 | Wilson | 310/217 |
| 3,991,334 | 11/1976 | Cooper | 310/260 |
| 4,051,399 | 9/1977 | Stanwick | 310/258 |
| 4,100,439 | 7/1978 | Boer | 310/260 |

FOREIGN PATENT DOCUMENTS

| | | | |
|---|---|---|---|
| 1366320 | 6/1964 | France | 310/260 |
| 7612051 | 10/1976 | France | 310/260 |

*Primary Examiner*—R. Skudy  
*Attorney, Agent, or Firm*—J. W. Keen

[57] ABSTRACT

A system for ensuring uniform axial expansion of a dynamoelectric machine's stator core subjected to elevated temperatures. The stator core constitutes axially adjacent ferromagnetic laminations held in axial compression by through-bolts axially extending through an intermediate portion thereof and building bolts situated in notches formed in the radially outer periphery of the laminations. The building bolts are secured to bore rings which circumferentially encircle and provide support for the stator core. The bore rings are rigidly secured in the axial direction by structural members connected to the bore rings and surrounding machine frame. Nuts disposed on each axial end of the through-bolts are torqued to allow at first axial expansion of the core while maintaining a selected degree of axial compression of the laminations during operation at elevated temperatures. Thermal axial expansion of the building bolts is restrained by their securement to the bore rings and the bore rings' axial securement to the dynamoelectric machine's frame. A spring is disposed on each axial end of the building bolts between the laminations and a building bolt nut. Suitable selection of the spring's force constant and tightening torque for the building bolt nuts permits a second axial expansion of the lamination's outer periphery which is at least as great as the first axial expansion of the lamination's intermediate portions. Uniform axial expansion of the lamination portions between the outer periphery and intermediate portion is provided by a rigid core support plate radially disposed between and intersected by the through-bolts and building bolts.

3 Claims, 4 Drawing Figures

2

4,227,109

1

SYSTEM FOR PROVIDING UNIFORM AXIAL EXPANSION OF A STATOR CORE

BACKGROUND OF THE INVENTION

1. Field of the Invention

This invention relates to stator cores of dynamoelectric machines, and more particularly, to means for ensuring uniform axial expansion of the stator core when subjected to elevated temperatures.

2. Description of the Prior Art

Stator cores of large dynamoelectric machines such as generators are typically supported within a stationary frame and usually constitute many, axially thin annular laminations which are assembled together and compressed to form a cylindrical stator core. Radial slots formed in the radially inner periphery of the stator core receive stator coils therein which extend beyond both axial ends of the stator core and are suitably interconnected to form a stator winding. The portions of the stator coils which extend axially beyond the ends of the stator constitute end turns which are supported by coil support assemblies. Such coil support assemblies are primarily disposed on the radial outside of the end turns and are connected to stator core support systems. Through-bolts extend axially through the stator core laminations, through magnetic end shields disposed on each end of the stator core, and through the core support system. Building bolts disposed along the radially outer periphery of the stator core laminations similarly extend through the magnetic end shields and core support systems. Nuts disposed on both axial ends of the through-bolts and building bolts have typically been sufficiently torqued to hold the core support systems in the desired, assembled position and maintain the axial continuity and integrity of the stator core.

While the through-bolts are free to slide axially relative to the dynamoelectric machine's frame, the building bolts are usually welded or otherwise securely fastened to bore rings which circumferentially surround and support the stator core at predetermined axial locations. The bore rings, in turn, are rigidly connected to the dynamoelectric machine's frame to prevent relative axial movement between the bore rings and frame. During operation of the dynamoelectric machine, the stator core and previously mentioned bolts are subjected to elevated temperatures primarily resulting from losses and inefficiencies sustained in the stator core. Such elevated temperatures cause the stator core laminations and through bolts to undergo thermal expansion in both axial directions. The building bolts, however, cannot appreciably expand in the axial direction due to their rigid axial interconnection with the machine's frame. Since the building bolts do not significantly expand in the axial direction and the through bolts do, the magnetic end shields, core support systems, and attached coil support assemblies rotate about the nuts connected to the building bolts. Such rotation can result in separations between components of the coil support systems. Such separations permit radially outward movement of the stator winding's end turns and concomitant rubbing, wearing, and fretting of elements such as the coils, coil insulation, coil spacers, and tapered separation blocks disposed between the coils at each end turn. Such wearing and fretting of the various elements can have a deleterious effect on their performance and may, after extended operation time, necessitate repair and/or refurbishment of such elements. Repair of such elements normally requires removing the dynamoelectric machine from service at great cost and inconvenience to the operating utility.

Since the through-bolts typically constitute non-magnetic material which has a rate of thermal expansion greater than that of the stator core laminations, the aforementioned rotation-separation phenomenon is further accentuated. As a result, uniform axial expansion of the stator core has been judged to be necessary to eliminate the rotation phenomenon and avoid the excessive generator element wear.

SUMMARY OF THE INVENTION

In accordance with the present invention, a dynamoelectric machine having a uniformly axially expansible stator core is provided. The invention generally comprises a cylindrical stator core having a radially outer periphery portion and a radially intermediate portion, a plurality of through-bolts extending axially through the intermediate portion of the stator core, a through-nut disposed on each axial end of the through-bolts, a machine frame surrounding the stator core, a plurality of bore rings circumferentially surrounding the stator core at predetermined axial locations, structural connections between the bore rings and the frame for preventing relative axial displacement therebetween, a plurality of building bolts rigidly secured to the bore rings and disposed about the stator's outer periphery, a building nut disposed on each axial end of the building bolts, and biasing means disposed between the building nuts and stator core for regulating the axial displacement of the stator core's outer periphery portion to be at least as great as the axial displacement of the stator core's intermediate portion at a predetermined temperature.

In a preferred embodiment of the invention a plurality of rigid coil support plates are disposed on each axial end of the stator core radially between the building bolts and through-bolts so as to restrain axial displacement of the stator core portions between the intermediate and outer periphery portions. Proper selection of the through-nuts' tightened torque, the building nuts' tightening torque, and the biasing means' biasing force will provide a stator core which is uniformly axially expansible when subjected to elevated temperatures.

BRIEF DESCRIPTION OF THE DRAWINGS

The invention will be more fully understood from the following detailed description of a preferred embodiment, taken in connection with the accompanying drawings, in which.

DESCRIPTION OF THE PREFERRED EMBODIMENT

The present invention is concerned primarily with axial expansion regulation means for stator cores of dynamoelectric machines. Accordingly, in the description which follows, the invention is shown embodied in a large gas-cooled turbine generator. It should be understood, however, that the invention may be utilized to ensure uniform axial expansion of a stator core in any dynamoelectric machine.

Figure 1:
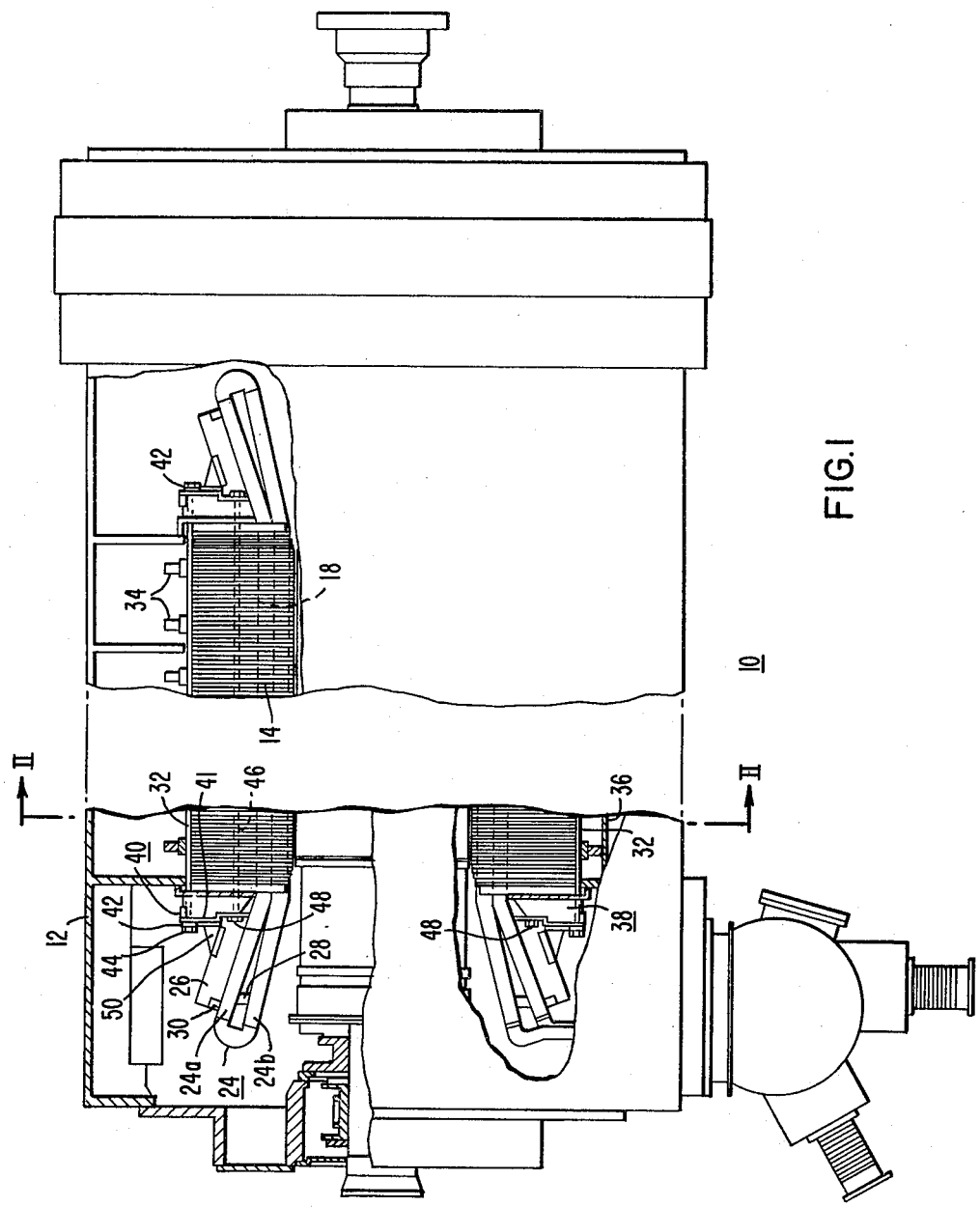
FIG. 1 is a transverse sectional view of an exemplary turbine generator in which the invention is incorporated.

In FIG. 1 the invention is shown by way of illustration disposed in operating position within a large turbine generator 10. The illustrated generator 10 is of a gas ventilated construction, but generators having liquid cooling of the rotor's field winding and/or the stator winding can utilize the present invention with equal facility.

Generator 10 has a stationary, outer gas-tight housing or frame 12 which is filled with a coolant gas such as hydrogen. Generator 10 has a laminated stator core 14 constituting a plurality of axially thin annular magnetic punchings of predetermined radial extent and arcuate expanse. Punchings 16, when assembled together, constitute the cylindrical stator core 14. Each laminated punching 16 includes radially outwardly directed slots 18 formed along its inner periphery, a plurality of circumferentially separated intermediately-disposed openings 20 and a plurality of notches 22 are disposed along the radially outer periphery. The number and size of openings 20 and notches 22 are primarily dependent on the length, diameter, and weight of stator core 14.

Figure 4:
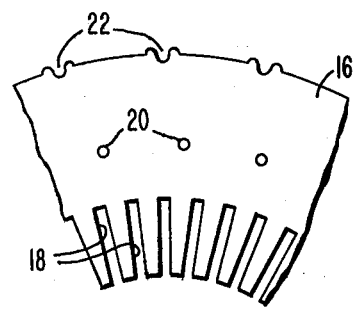
FIG. 4 is a detailed elevation view of a portion of a stator core lamination.

Slots 18, as illustrated in FIG. 4, receive stator winding coils therein. The stator winding coils are interconnected on both axial ends of stator core 14 to form a stator winding. Such interconnection of the stator coils results in stator end turns 24. Micarta coil supports 26 are disposed radially outside and against radially outer coil portion 24a of end turn 24. Tapered block 28 is disposed between radially outer and inner coil portion 24a and 24b, respectively, to maintain proper spatial configuration therebetween during operation. Support ring 30 constitutes an insert in each micarta coil support 26 and extends circumferentially between individual micarta coil supports 26 so as to structurally integrate them into a composite member. Coil supports 26 and support ring 30 provide bracing for end turns 24 against radially outward movement during generator operation from electromagnetic forces imposed thereon.

Figure 2:
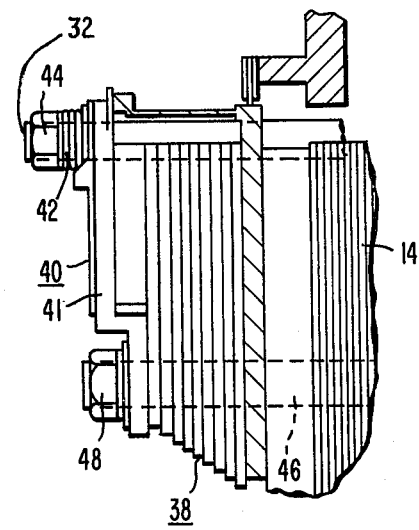
FIG. 2 is a transverse sectional view of one end of the stator core illustrated in FIG. 1.
Figure 3:
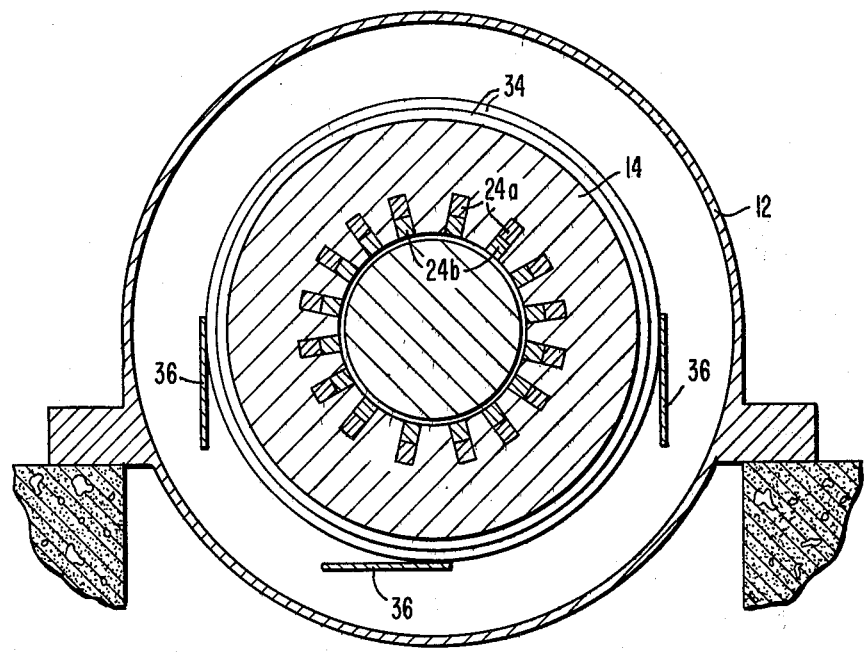
FIG. 3 is a partial axial sectional view of the turbine generator of FIG. 1 illustrating a support structure between the machine's stator core and frame.

Building bolts 32 are axially disposed in notches 22 formed in the outer periphery of punchings 16. Building bolts 32 are securely fastened to bore rings 34 preferably by welding. Bore rings 34 circumferentially surround stator core 14 and are axially disposed at predetermined locations so as to provide structural support for building bolts 32 which, in turn, maintain proper configuration of the individual punchings 16. Bore rings 34 are connected to frame 12 by flexible mounting members 36 as illustrated in FIG. 3. Mounting members 36 are preferably disposed at positions corresponding to 3 o'clock, 6 o'clock, and 9 o'clock and are simultaneously radially flexible and axially rigid. Such axial rigidity of mounting members 36 prevents relative axial movement of the bore rings 34 and frame 12 while the positive securement of building bolts 32 to bore rings 34 prevents relative axial movement between building bolts 32 and frame 12. FIG. 2 is an enlarged view of one end of the stator core 14 shown in FIG. 1 and better illustrates building bolts 32 extending through magnetic end shields 38 and core support systems 40 which include core support plates 41. Biasing means such as spring 42 is preferably disposed axially adjacent the core support plates 41 on both axial ends of each building bolt 32. Springs 42 are held in place by building bolt nuts 44 which are disposed on the axially outer ends of building bolts 32 and are in threaded engagement therewith.

Insulated through-bolts 46 extend axially through the openings 20 in the radially intermediate portions of punchings 16. Through-bolts 46 also intersect core support plates 41. The intermediate portions of punchings 16 are maintained in selective axial compression by through-bolt nuts 48 disposed axially adjacent core support plates 41 on both axial ends of through-bolts 46. Micarta coil supports 26 are secured to core support plates 41 by coil support bracket 50. Micarta coil supports 26 and core support plates 41 are interconnected through coil support bracket 50 by bolting, welding, or other suitable connection means.

During normal operation of generator 10, stator core 14 and other associated components such as building bolts 32 and through-bolts 46 are subjected to elevated temperatures as a result of resistance heating and other losses incurred therein. Such elevated temperatures cause thermal axial expansion of stator core 14 and insulated through-bolts 46, but thermal axial expansion of building bolts 32 is restricted by their positive securement and rigid interconnection with frame 12. Due to the difference in axial thermal expansion of the building bolts 32 and through-bolts 46, of core support system 40, coil support brackets 50 and micarta coil supports 26 tend to rotate about the ends of building bolts 32. Uniform axial expansion of stator core 14 is required to prevent such rotation and separation between support rings 30 and coil supports 26. Suitable selection of spring 42's biasing force provides axial displacement at the operating temperature of the outer periphery of stator core 14 equal in magnitude to the axial displacement of the intermediate portion. Additional adjustments for ensuring uniform axial core expansion include torqueing nuts 44 and 48 such that at the design operating temperature thermal expansion of through-bolts 46 will be less than or equal to the axial displacement of springs 42.

The core support system's plate 41 disposed radially between building bolts 32 and through-bolts 46 ensure substantially equal axial lamination expansion of the intermediate portions, outer periphery portions, and portions radially therebetween. If, as is commonly the case, non-magnetic through-bolts 46 have a coefficient of thermal expansion greater than the stator core 14, nuts 48 must be sufficiently torqued at ambient, assembly temperature to provide the compressive force necessary to axially hold laminations 16 together at the operating temperature. Maintaining the laminations' compression at elevated temperatures necessitates the use of high strength through-bolts 46 and nuts 48. Through-bolt and nut materials having a yield strength of at least 90,000 psi preferably constitutes alloys of chrome-nickel-manganese. Proper coordination of the tightening torques of nuts 44 and 48 and selection of spring constant 42 permits ensurance of uniform axial expansion and displacement of stator core 14 at the normal operating temperature.

It will now be apparent that an improved dynamoelectric machine 10 has been provided in which axial expansion of stator core 14 is regulated to be uniform across its radial expanse. Such uniform axial expansion maintains contact between support rings 30 and micarta coil supports 26 during normal, elevated temperature operation. Such construction substantially reduces relative movement and fretting of coils 24a, 24b, tapered block 28, and other coil spacers. Such construction and tightening torque coordination extend the life of generator 10's components and reduce its down time for repair and/or refurbishment.

I claim:

1. A dynamoelectric machine comprising:

a cylindrical stator core constituting a plurality of axially adjacent laminations, each of said laminations having radially inner and outer peripheries, said inner periphery having slots which extend a predetermined distance in the radially outer direction terminating on an intermediate portion;

a frame disposed about said stator core;

a plurality of bore rings circumferentially disposed about said stator core to provide circumferential structural support therefor;

means for structurally connecting said bore rings and said frame to provide an axially rigid link therebetween;

a plurality of axially extending threaded building bolts rigidly connected to said bore rings and in axially sliding relationship with said laminations along said outer peripheries;

a plurality of axially extending threaded through-bolts disposed through said laminations' intermediate portions in axially sliding relationship therewith;

a plurality of through-nuts in torqued threaded engagement with said through-bolts, at least one through-nut being disposed on each axial end of each through bolt, said torqued threaded engagement providing a first predetermined axial displacement of said lamination's intermediate portions at a selected temperature;

a plurality of building nuts in torqued threaded engagement with said building bolts, at least one building nut being disposed on each axial end of each building bolt; and biasing means disposed axially between said building nuts and said laminations for enabling a second predetermined axial displacement of said lamination's outer peripheries at the selected temperature, said second axial displacement being at least as great as said first axial displacement.

2. The dynamoelectric machine of claim 1 further comprising:

a plurality of core support plates disposed on each axial end of said core for restraining axial displacement cf the lamination portion radially between the through bolts and building bolts.

3. The dynamoelectric machine of claim 1 wherein said bolts comprise non-magnetic material.

* * * * *